June 6, 1939.  M. DE KREMER  2,161,285
SYNCHRONIZING CLUTCH MECHANISM
Filed June 4, 1938
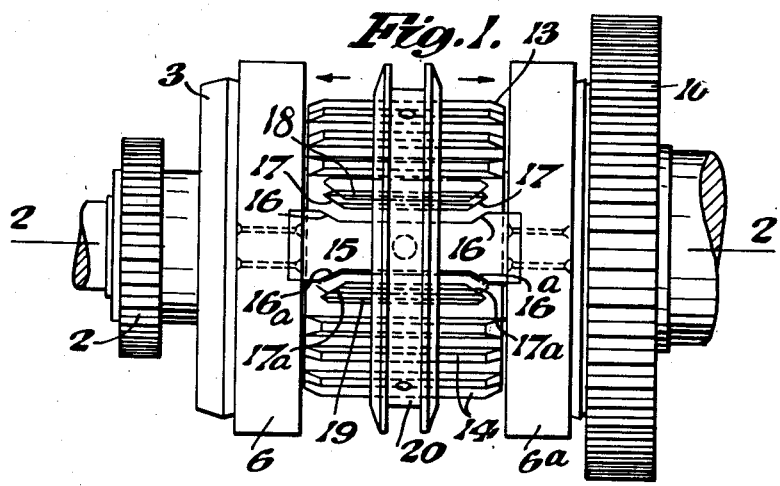
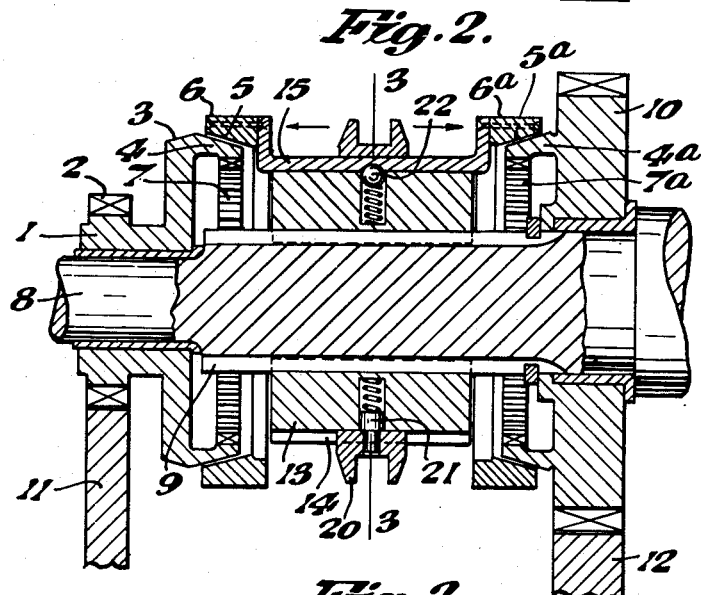
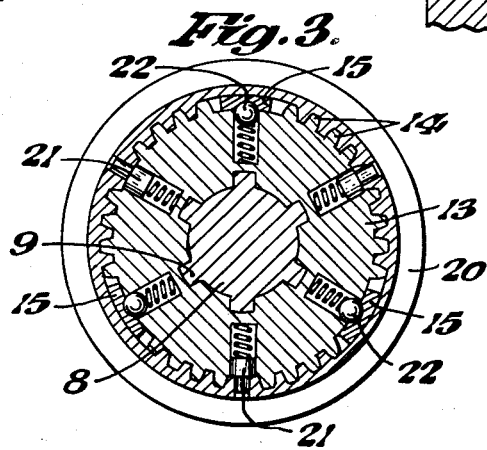
INVENTOR
MILY DE KREMER
PER George Hughes
ATTORNEY Patented June 6, 1939

2,161,285

UNITED STATES PATENT OFFICE 2,161,285

SYNCHRONIZING CLUTCH MECHANISM

Mily de Kremer, London, England

Application June 4, 1938, Serial No. 211,846
In Great Britain June 23, 1937

4 Claims. (Cl. 192—53)

The invention relates to change speed power transmission mechanism primarily designed for use in automobile change speed gear and operating on the synchro-mesh principle designed to enable gear changes to be made without clash, and of the kind comprising a friction clutch element and a positive clutch element on the driving member adapted to be engaged by a pair of axially movable complementary elements on the driven member, engagement being effected by inclined surfaces on the movable positive clutch element engaging complementary surfaces on its associated friction clutch element, whereby the latter is first engaged and then the positive clutch element, after synchronization of the speeds of the members, said surfaces being normally in alignment for such coaction in the case of asynchronism of speeds. The invention is concerned more particularly with the arrangement according to which such friction and positive clutches are duplicated to provide for two speeds selectively, there being two axially movable friction clutch elements which are coupled and associated with a double positive clutch element splined to the driven member for bidirectional axial movement and having external clutch teeth, movement of said double clutch element in one direction causing, after engagement of the one friction clutch, its external teeth to engage with the complementary clutch element with consequential engagement of one speed, and movement in the opposite direction effecting, after engagement of the other friction clutch, engagement of its teeth with the other clutch element with a consequential engagement of another speed.

The object of the invention is to provide a device of this character which, whilst efficient and reliable in operation, is relatively simple in construction and compact, consequently inexpensive to manufacture.

According to the invention the axially movable pair of friction clutch members are interconnected by yoke members presenting inclined faces with which are adapted to coact complementary inclined faces presented by both ends of the external clutch teeth on the double positive clutch element splined to the driven member for axial movement. Thus, in changing gear, in the case of asynchronism of the speeds of the members to be clutched, the inclined faces on the teeth will be in alignment with the coacting faces on the yoke members, so that the axial movement imparted to the positive clutch member by the change speed lever will result first in engagement of the friction clutch members, and after the resultant synchronization of the speeds said positive clutch members will continue to move axially independently and engage with one or the other of its complementary fixed positive clutch members. Further features of the invention are described hereinafter and specifically pointed out in the appended claims.

The invention is illustrated in the accompanying drawing showing part of the transmission mechanism of a gear box embodying the invention in which the friction and positive clutches are duplicated to provide two speeds selectively, and wherein:—

Fig. 1 is a plan view.

Fig. 2 is a longitudinal vertical section on the line 2—2 of Fig. 1, and

Fig. 3 is a cross section on the line 3—3 of Fig. 2.

Referring to the drawing 1 designates a driving clutch shaft provided with a gear 2 and a friction clutch member 3 presenting a ring 4 having an external conical face 5 with which coacts a complementary clutch ring 6. The ring 4 is provided internally with clutch teeth 7. 8 designates a driven main shaft having splines 9, and on which is a gear 10 presenting a ring 4a having an external conical face 5a with which coacts a complementary clutch ring 6a and the ring 4a being provided internally with clutch teeth 7a said parts 4a, 5a, 6a, 7a being duplicates of the parts 4, 5, 6, 7. The shaft 1 with gear 2 and the gear 10 are both loose on the shaft 8, and said gears 2 and 10 are in constant mesh with gears 11 and 12 respectively on a lay-shaft (not shown). Splined to the shaft 8 for axial sliding movement thereon is a positive clutch member 13 having peripheral clutch teeth 14 which are adapted to engage either with the teeth 7 or 7a, and said teeth 14 are pointed at their ends as shown in Fig. 1 to facilitate engagement with the teeth 7 or 7a. The clutch rings 6 and 6a are connected by U shaped yoke pieces 15, of which there may be three, as shown, the rings 6, 6a being carried by the flanges of said yoke pieces. The yoke pieces may be connected to the rings 6, 6a as shown, or integral therewith, and they are each provided with two pairs of shoulders presenting inclined faces 16, 16a coacting with similarly inclined faces 17, 17a on the ends of teeth 18, 19 which are disposed on opposite sides of the yoke members and also act with the other teeth 14 to engage the teeth 7 or 7a. The distance between the two adjoining teeth 18, 19 is slightly greater than the width of the yokes 15 at their widened ends. Surrounding the yoke members 15 is a ring 20 connected to the member 13 by a plurality of studs 21 which, as shown, are preferably spring loaded to enable the ring 21 to be removed with the yoke pieces 15. The ring 20 may be serrated on the inside for engagement with the teeth on member 13 and is provided with recesses, as shown, to take the yoke members 15. The ring 20 serves to slide the member 13 to the right or left and is itself moved accordingly by a striker fork not shown, engaging in the peripheral recess in said ring and operated by a change speed lever. Between each yoke 15 and the member 13 is a spring loaded locating ball 22.

Whenever there is a differential rotation between shaft 1 and 8 or gear 10 and shaft 8 the drag will result in the teeth 18 or 19 bearing against the corresponding sides of the yokes with their inclined end faces 17 or 17a opposite the faces 16 or 16a on the yokes, such alternative positions depending, of course, on whether the shaft 1 is rotating at a speed above that of shaft 8 or vice versa. In Fig. 1 the teeth 19 are shown in chain lines as bearing, for instance against the yoke with its faces 17a opposite the faces 16a on the yoke. For top speed the ring 20 is moved by the control lever and striker fork to the left so that the member 13 is slid axially and through the medium of the balls 22 and the end faces 17a of teeth 19 engaging the shoulders 16a the yokes 15 are forced endwise with consequential engagement of the clutch member 6 with clutch member 3. The frictional engagement of the parts 4 and 6 causes the rotational velocity of the member 13 to be accelerated and as soon as the speeds of the two shafts are synchronous the member 13 will continue to move axially independently of the yokes, so that the teeth 14 will engage the teeth 7. Similarly, to engage the other speed the ring is moved axially in the opposite direction so that the clutch members 6a, 4a are first engaged and then the dog clutch teeth 14, 7a whereby gear 10 will be clutched to its shaft 8. In the case of the teeth 18, 19 being in the position shown in full lines relatively to the yokes 15, the latter will, of course, be slid through the medium of the balls 22 only.

I claim:

1. Synchromesh change speed gear comprising duplicate pairs of friction and positive clutch elements, a set of yoke members interconnecting a pair of the friction clutch elements for sliding them into and out of engagement with the co-operating pair of friction clutch elements, a rotary driving member carrying one of the latter friction clutch elements and another driving member carrying the other, a driven member, a double positive clutch element splined to the said driven member, clutch teeth on the double positive clutch element and co-operating complementary inclined faces on each of the yoke members and the said teeth.

2. Synchromesh change speed gear comprising duplicate pairs of friction and positive clutch elements, a set of yoke members interconnecting a pair of the friction clutch elements for sliding them into and out of engagement with the co-operating pair of friction clutch elements, a rotary driving member carrying one of the latter friction clutch elements and another driving member carrying the other, a driven member, a double positive clutch element splined to the said driven member, clutch teeth on the double positive clutch element, each of said yoke members being interposed between a pair of said teeth, and complementary inclined faces on said yoke members and the pairs of teeth between which they are disposed, said inclined faces of the teeth being at the ends of the appropriate teeth.

3. Synchromesh change speed gear comprising duplicate pairs of friction and positive clutch elements, a set of U shaped yoke members, a pair of friction clutch elements supported by the end limbs of the U shaped yoke members and adapted to be slid into and out of engagement with the co-operating pair of friction clutch elements, a rotary driving member carrying one of the latter friction clutch elements and another driving member carrying the other, a driven member, a double positive clutch element splined to the said driven member, clutch teeth on the double positive clutch element and co-operating complementary inclined faces on each of the centre limbs of the yoke members and the said teeth.

4. Synchromesh change speed gear comprising duplicate pairs of friction and positive clutch elements, a set of U shaped yoke members secured by their end limbs to a pair of the friction clutch elements for sliding them into and out of engagement with the co-operating pair of friction clutch elements, a rotary driving member carrying one of the latter friction clutch elements, and another driving member carrying the other, a driven member, a double positive clutch element splined to the said driven member, clutch teeth on the double positive clutch element, each centre limb of each of said U shaped yoke members being interposed between a pair of said teeth, and complementary inclined faces on said centre limbs of the yoke members and the pairs of teeth between which they are disposed, said inclined faces of the teeth being at the ends of the appropriate teeth.

MILY DE KREMER.